April 9, 1957 W. S. DRUZ 2,788,387

SUBSCRIPTION TELEVISION SYSTEM

Filed Oct. 2, 1951 2 Sheets-Sheet 1

INVENTOR:
WALTER S. DRUZ
BY Francis W. Crotty
HIS ATTORNEY.

INVENTOR:
WALTER S. DRUZ
BY Francis W. Crotty
HIS ATTORNEY.

United States Patent Office 2,788,387

Patented Apr. 9, 1957

2,788,387

SUBSCRIPTION TELEVISION SYSTEM

Walter S. Druz, Chicago, Ill., assignor to Zenith Radio Corporation, a corporation of Illinois Application October 2, 1951, Serial No. 249,263

7 Claims. (Cl. 178—5.1)

This invention relates to subscription television systems and, more particularly, to an arrangement for subscription signalling such that charges to subscribers may be assessed on an equitable basis predicated on the time of use of the subscription signal and on the quality or value of the programs received.

Customarily, in subscription systems the radiated television signal is coded at the transmitter, and each subscriber receiver is equipped with suitable decoding apparatus to permit the reproduction of images represented by this signal. In one particular system, the coding schedule at the transmitter is stored on a suitable record such as a magnetic disc or cylinder, code card or the like, and this record is recurrently scanned to produce a repetitive coding signal for actuating the coding apparatus to code the television signal. In such a case, each subscriber is supplied with a record bearing a coding schedule identical to that of the transmitter, and scanning of this record develops a signal for actuating the decoding apparatus to enable the receiver to utilize the subscription signal.

In a subscription system of the type described the problem of assessing a proper and suitable charge to each subscriber is most troublesome. It has been proposed that the coding schedule of the transmitter be changed periodically, for example, once a week or once a month, necessitating a similar change at subscriber receivers. The subscriber then has a choice at the beginning of each period as to whether or not he wishes to purchase a new code record required for that period. However, once that record has been purchased, the subscriber in effect has been charged for all the programs disseminated during the period over which the record is useful whether he actually views them or not.

It is an object of the present invention to provide an improved subscription television system in which charging information is distributed to subscriber receivers concurrently with the broadcast programs so as to overcome the charging problems prevalent in the prior art.

A further object of the invention is to provide an improved subscription television system in which such charging information is recorded at each subscriber receiver so that charges for the subscription service may be assessed against each subscriber in an eminently fair and equitable fashion, and so that each subscriber may be charged only for programs actually received and at a rate based on the quality or value of each of the received programs.

The subscription television system of this invention includes a transmitter and at least one receiver. The transmitter comprises a source of signals representing intelligence to be transmitted, coding apparatus for effectively coding a signal derived from this source in accordance with a coding schedule, and means for transmitting the coded signal to the receiver. The transmitter further includes generating means for developing at least one charging signal for transmission to the receiver concurrently with the coded signal. The receiver comprises a reproducing device, apparatus for receiving the coded signal from the transmitter and for supplying the signal to the reproducing device, and a decoding device coupled to the last-mentioned apparatus for effectively decoding the coded signal as applied to the reproducing device. A signal-recording medium is coupled to the decoding device and is actuated during times of operation of the decoding device, a signal-selecting circuit is coupled to the last-mentioned apparatus for obtaining the charging signal, and means is coupled to the selecting circuit and responds to the derived charging signal for recording a signal on the medium indicating the intervals of utilization of the coded signal by the receiver.

The features of this invention which are believed to be new are set forth with particularity in the appended claims. The invention itself, however, together with further objects and advantages thereof may best be understood by reference to the following description when taken in conjunction with the accompanying drawings, in which:

Figure 1:
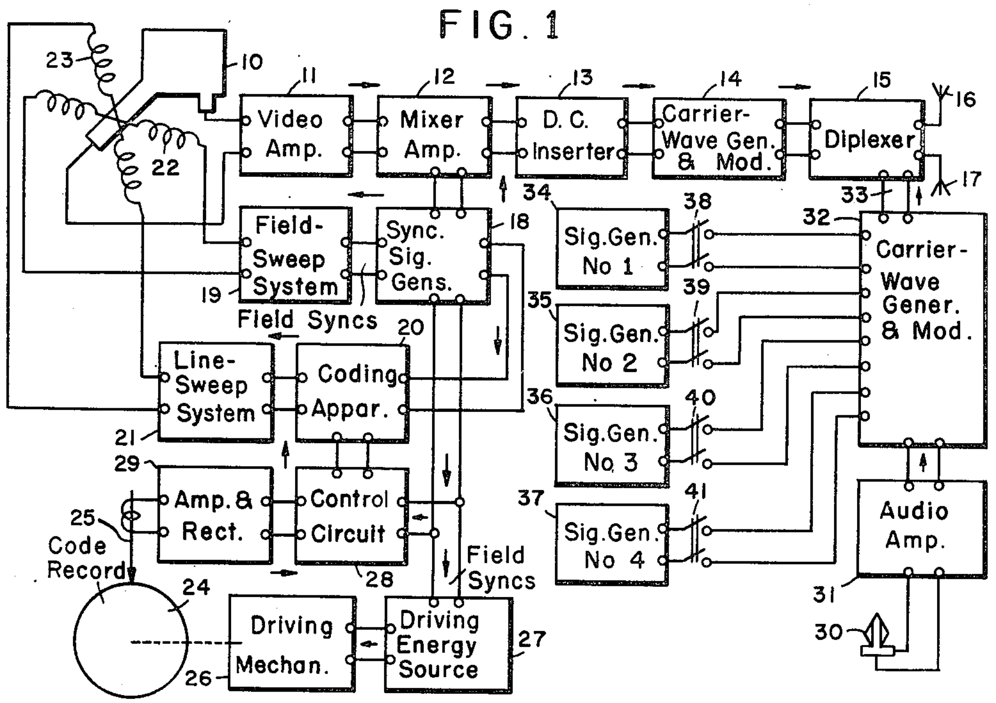
Figure 1 represents a transmitter constructed in accordance with the invention.

The transmitter of Figure 1 includes a picture-converting device 10 which may be an iconoscope, image orthicon or any other well-known type having output terminals connected to a video amplifier 11 of any desired number of stages. This amplifier is connected to a mixer amplifier 12 having output terminals connected through a direct-current inserter 13 to a carrier-wave generator and modulator 14, the latter being coupled through a diplexer circuit 15 to a suitable antenna 16, 17. The transmitter also includes a synchronizing and blanking signal generator 18 coupled to mixer amplifier 12 to supply line- and field-synchronizing and blanking pulses thereto, and further connected to a field-sweep system 19, and through a coding apparatus 20 to a line-sweep system 21. The output terminals of sweep systems 19, 21 are connected to the field- and line-deflection elements 22 and 23 associated with device 10.

The television signal radiated by the transmitter of Figure 1 is coded in accordance with a repeating coding schedule which is established on a code record 24. This record may, for example, be a magnetic disc having a selected coding schedule magnetically recorded thereon about its periphery. A pick-up head 25 is associated with code record 24 and repeatedly scans the recorded coding schedule upon rotation of the record by a driving mechanism 26. Driving mechanism 26 is energized by any suitable source 27 coupled to unit 18 to be synchronized at a frequency corresponding to the field-scanning frequency of the transmitter. It is preferable that the disc 24 rotate at a speed that is low relative to the field-scanning frequency, and this can be achieved by sychronizing source 27 at some sub-multiple of this frequency, or introducing a suitable reduction gear between mechanism 26 and the disc. Pick-up head 25 is coupled to a control circuit 28 through an amplifier and rectifier 29. Circuit 28 has another pair of input terminals connected to synchronizing signal generator 18 and a pair of output terminals connected to coding apparatus 20.

A sound transducer or microphone 30 is coupled through an audio amplifier 31 to a carrier-wave generator and modulator 32, the output terminals of unit 32 being coupled to diplexer 15 by way of leads 33. A plurality of signal generators 34—37 generate a corresponding plurality of what shall be termed herein as "charging signals" each having a distinctive frequency, and these generators are connected to unit 32 through switches 38—41, respectively.

The shade values of the scene to be televised are converted into a video signal by device 10, and the video signal is amplified in video amplifier 11 and combined in mixer amplifier 12 which line- and field-synchronizing and blanking pulses from generator 18 to produce a composite television signal at the output terminals of the mixer. The television signal is appropriately adjusted as to background level by inserter 13 and, in accordance with present-day standards, is amplitude-modulated on a suitable carrier in unit 14. The sound intelligence accompanying the televised scene is transformed into an audio signal by microphone 30, the audio signal being amplified in amplifier 31 and, in accordance with present-day standards, frequency-modulated on a suitable carrier in unit 32. The amplitude-modulated picture carrier from unit 14 and the frequency-modulated sound carrier from unit 32 are applied to diplexer 15 for radiation from antenna 16, 17. The various stages of the transmitter for producing the modulated picture and sound carriers are well known to the art and a detailed explanation of the circuitry involved in these units is believed to be unnecessary.

As previously stated, the television signal is coded in accordance with a coding schedule established on record disc 24. It may be assumed that the code indicia comprise a series of discontinuous bursts of a signal of a given frequency so that scansion of the record pick-up head 25 develops a pulse modulated coding signal having a series of bursts or pulses occurring in a repeating sequence established by the code record. The coding signal is selected, rectified and amplified in unit 29 and applied to control circuit 28. The control circuit conjointly responds to the pulse components of the rectified signal from unit 29 and to the field-synchronizing pulses from generator 18 to impress a further series of pulses on coding apparatus 20, each such pulse corresponding to a pulse component of the signal from unit 29 but having leading and trailing edges coincident with the field pulses immediately following the start and termination of the aforesaid pulse component. Consequently, each pulse delivered to coding apparatus 20 is initiated and terminated during field-retrace intervals. Coding apparatus 20 includes a delay line and switch which in one operating condition delays the line-synchronizing pulses translated thereby to the line-sweep system and in an alternative operating condition translates the line pulses with no delay at all. The switch may be considered normally to be in its last-described operating condition and to respond to each coding pulse from control circuit 28 to assume its other operating condition for the duration of each coding pulse. The delay introduced in the translation of the line-synchronizing pulses causes a corresponding shift in the timing of the line scanning of device 10. This, in turn, results in an alteration in the timing between the video signal applied to mixer amplifier 12 and the line-synchronizing pulses supplied to the mixer from unit 18. Accordingly, the television signal radiated by the transmitter is effectively coded because the timing of its video components relative to its line-synchronizing components is not invariable but shifts during spaced intervals determined by the pulses applied to coding apparatus 20. These spaced intervals are determined by the coding schedule established on code record 24, but, due to the action of control circuit 28, they commence and terminate during field-retrace intervals to preclude distortions that could arise should the variations in timing occur during trace intervals. The construction of coding apparatus 20 and control circuit 28 is shown in detail in Patent No. 2,547,598, issued to Erwin M. Roschke, on April 3, 1951, entitled "Subscription, Image Transmission System and Apparatus" and assigned to the present assignee. Hence, a detailed discussion of these units is believed to be unnecessary.

Consideration may now be given to the manner in which subscription charges may be assessed against subscribers who receive and utilize the telecast. It is to be expected that some of the televised programs will require a greater charge than others and for this reason, provision is made in the transmitter for the concurrent transmission of one or more charging or rate signals along with the subscription broadcast. The charging signals originate at generators 34—37, one or more of which is connected to unit 32 by switches 38—41 depending on the charge to be assessed for any particular broadcast. For example, if switch 38 only is closed, the radiated television signal has a modulation component representing the signal from generator 34 and denoting one subscription rate. On the other hand, if switches 39—41 are closed, the radiated signal includes components corresponding to the other generators and designating a different program-charge rate. The charging signals have distinctive frequencies and may be transmitted individually or in selected combinations to represent preselected charging rates for broadcast programs. At the same time, the signal from generator 34 or from any of the other generators may be used to identify the transmitting station, in which case it is transmitted at all times with the subscription telecast.

Figure 2:
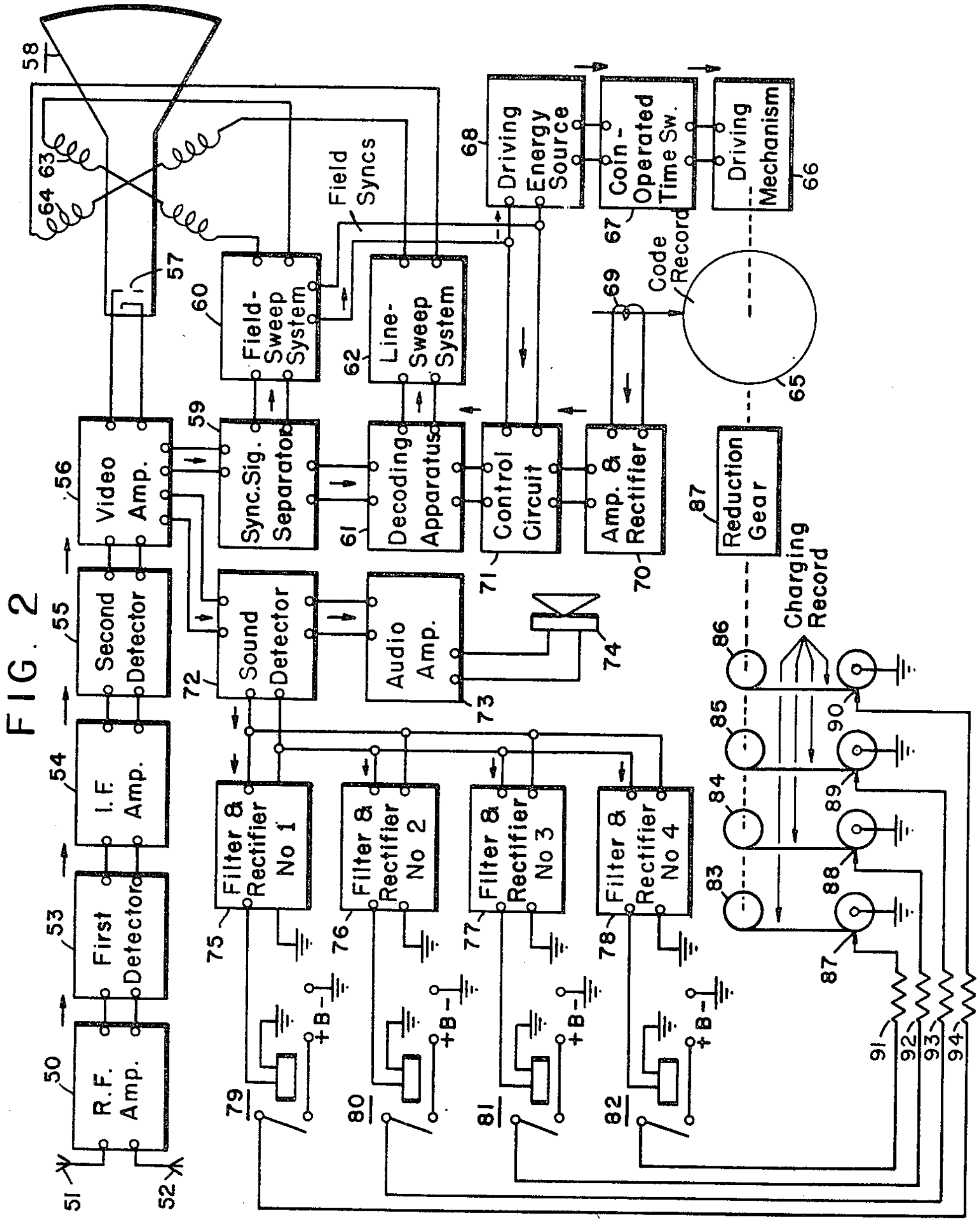
Figure 2 shows a receiver for operation in conjunction with the transmitter of Figure 1, and Figures 3A and 3B are schematic representations of charging information recorded at a subscription receiver.

The receiver of Figure 2 includes a radio-frequency amplifier 50 of one or more stages having input terminals connected to an antenna circuit 51, 52 and output terminals coupled to a first detector 53. First detector 53 is connected through an intermediate-frequency amplifier 54 of any desired number of stages to a second detector 55 which, in turn, is connected through a video amplifier 56 of one or more stages to the input electrodes 57 of a cathode-ray image-reproducing device 58. Video amplifier 56 is coupled to a synchronizing-signal separator 59 which, in turn, is connected to a field-sweep system 60 and through a decoding apparatus 61 to a line-sweep system 62. The output terminals of sweep systems 60, 62 are connected respectively to the field- and line-deflection elements 63, 64 associated with reproducing device 58.

The receiver also includes a code record 65 which may be a magnetic disc similar to disc 24 at the transmitter and having an identical coding schedule magnetically recorded thereon. Disc 65 is driven by a driving mechanism 66 which is coupled through a coin-operated time switch 67 to a driving source 68. As will be seen, switch 67 is not an essential element of the invention and may be omitted if so desired. Source 68 is coupled to field-sweep system 60 to derive field-synchronizing pulses therefrom to synchronize the source so that disc 65 may be rotated in synchronism with disc 24 at the transmitter. Initial phasing of the discs 24 and 65 may be effected by any well-known means, not shown. For example, the phasing arrangement described in detail in copending application 75,988, Herrick et al., filed February 12, 1949, and issued October 20, 1953 as Patent 2,656,407, entitled "Subscriber Signalling System," and assigned to the present assignee, may be used. Disc 65 has a pick-up head 69 associated therewith and connected through an amplifier and rectifier 70 to one input circuit of a control circuit 71 having another input circuit connected to field-sweep system 60 to derive field-synchronizing pulses therefrom. The output terminals of circuit 71 are connected to decoding apparatus 61.

In accordance with intercarrier-sound principles, video amplifier 56 may include an appropriate sound-selecting circuit connected to a sound detector 72 to which are coupled an audio amplifier 73 and a sound-reproducing device 74. The sound detector is also connected to a plurality of filters and rectifiers 75—78 constructed to select the various charging signals produced by generators 34—37 at the transmitter and transmitted concurrently with the television signal. These signals are used to actuate a charging register at the receiver which is constructed in the following manner. The output terminals of units 75—78 are connected respectively to a corresponding group of relays 79—82 to energize these relays upon the receipt of the various charging signals. Energization of any of the relays 79—82 closes its associated contacts and completes a connection to the positive terminal B+ of a unidirectional potential source having a grounded negative terminal. The contacts of these relays are connected through limiting resistors 91—94 to a series of recording heads 87—90 respectively associated with charging records 83—86. The charging records may consist of a series of reels of sensitized paper driven by mechanism 66 at a reduced speed through a reduction gear 87.

When the receiver of Figure 2 is tuned to the subscription signal from the transmitter of Figure 1, this signal is selectively amplified by radio-frequency amplifier 50 and heterodyned to the intermediate frequency of the receiver in first detector 53. The resulting intermediate-frequency signal is amplified in amplifier 54 and detected in second detector 55 to produce a composite video signal. The video signal after amplification in video amplifier 56 is applied to input electrodes 57 to control the intensity of the cathode-ray beam in reproducing device 58 in well-known fashion. The synchronizing components of the composite video signal are separated out by separator 59, the field-synchronizing pulses being applied directly to field-sweep system 60 to control the field scansion of device 58, and the line-synchronizing pulses being applied through decoding apparatus 61 to line-sweep system 62 to control the line scansion thereof.

When a coin is inserted in switch 67, code record 65 is rotated in synchronism with code record 24 at the transmitter so that a pulse-modulated signal, identical to that obtained from unit 29 at the transmitter, is supplied by amplifier and rectifier 70 to control circuit 71. The control circuit simultaneously receives field-synchronizing pulses from field system 60 and impresses a series of decoding pulses on decoding apparatus 61, corresponding to the coding pulses supplied to coding apparatus 20 at the transmitter and occurring in time coincidence therewith. These pulses actuate decoding apparatus 61 coincidently with the actuation of coding apparatus 20 at the transmitter and impart a compensating time variation in the line-synchronizing pulses applied to line-sweep system 62. Thus for each variation of the video components of the received television signal relative to the line-synchronizing components, there is a compensating variation in the line scansion of reproducing device 58 so that the reproducing device effectively corrects and reproduces the image intelligence represented by the subscription television signal.

An intercarrier signal, frequency-modulated with the sound information, is derived from video amplifier 56 and detected in sound detector 72, the resulting audio intelligence being amplified by amplifier 73 and reproduced by reproducing device 74. The various charging signals which also appear as modulations of the intercarrier signal are selected from the sound detector by units 75—78. Upon the receipt of any one of the charging signals, the corresponding filter-rectifier unit produces a rectified signal which energizes the associated relay and impresses an actuating potential on the corresponding one of the recording heads 87—90 for the duration of the charging signal. In the presence of the actuating potential a mark appears on the corresponding charging record and continues for the duration of such potential. Of course, the charging records 83—86 may be combined into one device carrying a single strip of sensitized paper with the recording heads mounted at various positions across the strip.

Figure 3A:
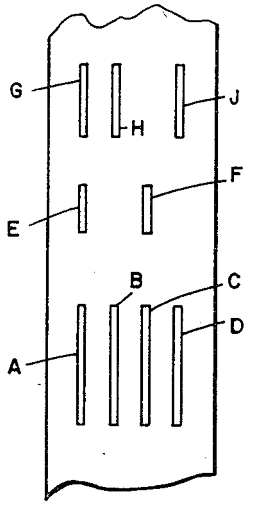

Figure 3A shows a fragment of a strip of sensitized paper that may be used in conjunction with the subscription charging mechanism. Whenever a subscriber wishes to receive a particular subscription program, he deposits a coin in time switch 67, causing driving mechanism 66 to be energized to rotate the code disc 65 and the charge-record discs 83—86 at selected speeds. The coin deposited in the time switch represents the minimum rate or a partial payment for any program. If the program tuned in carries a higher subscription fee than this minimum rate, an appropriate combination of charging signals is transmitted concurrently with the subscription telecast. Assuming that four charging signals are sent during a particular telecast, they cause the charging heads 87—90 to inscribe a record, such as marks A, B, C and D on the charging record and the length of these marks represents the length of time a program bearing that subscription rate has been received by the subscriber. When the telecast includes only two, rather than four, charging signals the record made on the sensitized charging strip of the receiver may appear as marking E and F. Still another subscription rate may be recorded as a combination of marks G, H and J on the sensitized strip. The subscriber is charged, in addition to the base rate represented by the coins in time switch 67, an amount computed upon the markings on the charging record. The charging record may be collected or read periodically, say once a month, and the subscriber is billed an appropriate amount, determined by the use of the system both as to time and the quality of the programs viewed. In this manner charges may be assessed against each subscriber on a fair and equitable basis, and he pays only for programs actually received and at a rate corresponding to the actual value thereof.

Figure 3B:
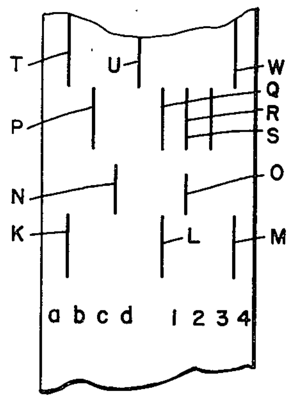

Should there be a plurality of subscription stations available to a given subscriber, it is contemplated that each station will be assigned one or more individual, distinctive identifying signals. The charge record at each subscriber receiver may then take the form shown in Figure 3B, being inscribed with certain markings representing charging-rate information and other markings indicating the subscription transmitter to be credited with the charging information. For example, longitudinal lines *a*—*d* are used to record station-identifying information, while lines 1—4 are used for entering rate-charging information. Should the receiver be tuned to a first station which transmits an identifying signal of a particular frequency, a mark K may appear on line *a* having a length corresponding to the time in which the receiver is tuned to that station. The charge information, denoted by markings L, M appearing adjacent mark K in the same time interval represented by the transverse lines, will be credited to that particular station. Similarly, a second station may mark line *c* with marking N, and charge information O will be credited to it. Likewise, a third station may mark line *b* with marking P and be credited with charging information represented collectively by marks Q, R and S. A fourth station may be identified by a pair of signals and mark lines *a* and *d* with related markings T and U and have charge information W credited to it, and so on.

It is evident that coin-switch 67 may be omitted and all charges be computed in accordance with the markings appearing in the charge record. It is also evident that the charging signals need not necessarily be transmitted continuously during the entire transmission interval of a particular program but may be sent at the beginning, end, or various times during such interval. Moreover, the charging and identifying signals need not be separate and distinct one from the other but may appear as modulations of a single signal. In addition, these signals may be distributed to the receivers as a modulation of the picture, rather than the sound, carrier; or over a line circuit. Finally, the conception of this invention is not limited to a subscription system in which the decoding schedule is stored at each receiver in suitable recording apparatus, although it is particularly suited to such a system. The charging arrangement can be used in subscription systems of the type wherein the decoding schedule is disseminated to subscriber receivers over a line circuit, the charging information also being distributed over the line circuit if so desired.

The invention provides, therefore, a subscription television system in which charging information is distributed to the various subscriber receivers concurrently with the subscription broadcast, the information being recorded at each receiver so that each subscriber may pay for the service on the basis of programs actually received, and at a rate based on the quality of each particular program.

While a particular embodiment of the invention has been shown and described, modifications may be made, and it is intended in the appended claims to cover all such modifications as fall within the true spirit and scope of the invention.

I claim:

1. A subscription television system including a transmitter and at least one receiver, said transmitter comprising: a television-signal source; coding apparatus coupled to said source for effectively coding a television signal from said source during a program interval in accordance with a coding schedule; means for developing a coding signal for actuating said coding apparatus in accordance with said coding schedule; means for developing a charging signal independent of said coding signal and representing a charging rate for the television signal; and means for concurrently radiating said charging signal with said coded television signal to said receiver; and said receiver comprising: an image-reproducing device; apparatus for receiving said coded television signal and said charging signal from said transmitter and for supplying said television signal to said reproducing device; a decoding device coupled to said last-mentioned apparatus for effectively decoding said coded television signal as applied to said reproducing device; control apparatus coupled to said decoding device for actuating said device in accordance with said coding schedule throughout said program interval; a recording medium coupled to said control apparatus and energized during times of actuation of said decoding device; means for deriving said charging signal; and means for utilizing the derived charging signal for recording a marking on said medium representing the charging information and indicating intervals of utilization of said television signal by said receiver.

2. A subscription television system including a transmitter and at least one receiver, said transmitter comprising: a television-signal source; coding apparatus coupled to said source for effectively coding a television signal from said source in accordance with a coding schedule; means for developing a coding signal for actuating said coding apparatus in accordance with said coding schedule; means for radiating the coded television signal to said receiver; and generating means for developing at least one charging signal representing a charging rate for said television signal independent of said coding signal and for radiation to said receiver concurrently with said television signal; and said receiver comprising: an image-reproducing device; apparatus for receiving said coded television signal and said charging signal from said transmitter and for supplying said television signal to said reproducing device; a decoding device coupled to said last-mentioned apparatus for effectively decoding said coded television signal as applied to said reproducing device; control apparatus coupled to said decoding device for actuating said device in accordance with said coding schedule; a signal-recording medium coupled to said decoding device and energized during times of actuation of said decoding device; a signal-selecting circuit coupled to said last-mentioned apparatus for obtaining said charging signal; and means coupled to said selecting circuit and responsive to the derived charging signal for recording a signal on said medium identifying the charging signal and indicating the intervals of utilization of said television signal by said receiver.

3. A subscription television system including a transmitter and at least one receiver, said transmitter comprising: a television-signal source; coding apparatus coupled to said source for effectively coding a television signal derived from said source during a program interval in accordance with a coding schedule; means for developing a coding signal for actuating said coding apparatus in accordance with said coding schedule; generating means for developing at least one charging signal independent of said coding signal and representing a charging rate for said television signal; means for combining said charging signal and said television signal; and means for radiating the combined signals to said receiver; and said receiver comprising: an image-reproducing device; apparatus for receiving said combined signals from said transmitter and for supplying said television signal to said reproducing device; a decoding device coupled to said last-mentioned apparatus responsive to an applied signal for effectively decoding said coded television signal as applied to said reproducing device; a signal source for supplying a decoding signal representing said coding schedule to said decoding device throughout said program interval; a signal-recording medium coupled to said last-mentioned source and actuated during times of operation of said decoding device; a signal-selecting circuit coupled to said last-mentioned apparatus for obtaining said charging signal; and means coupled to said selecting circuit and responsive to the derived charging signal for recording a signal on said medium indicating said charging signal during intervals of utilization of said television signal by said receiver.

4. A subscription receiver for utilizing a radiated television signal coded in accordance with a coding schedule during a program interval and for further utilizing a radiated charging signal independent of said coding schedule received concurrently with said television signal, said receiver comprising: an image-reproducing device; apparatus for receiving said coded television signal and for supplying said television signal to said reproducing device; a decoding device coupled to said last-mentioned apparatus for effectively decoding said television signal as applied to said reproducing device; control apparatus for developing a decoding signal for actuating said decoding device in accordance with said coding schedule throughout said program interval; a signal-recording medium coupled to said control apparatus and actuated during times of operation of said decoding device; a signal-selecting circuit coupled to said receiving apparatus for obtaining said charging signal separately from said decoding signal; and means coupled to said selecting circuit and responsive to the derived charing signal for recording a signal on said medium identifying said charging signal during intervals of utilization of said television signal by said receiver.

5. A subscription receiver for utilizing a radiated television signal coded in accordance with a coding schedule and for further utilizing a radiated charging signal independent of said coding schedule received concurrently with said television signal, said receiver comprising: an image-reproducing device; apparatus for receiving said coded television signal and for supplying said television signal to said reproducing device; a decoding device coupled to said last-mentioned apparatus responsive to an applied decoding signal for effectively decoding said television signal as applied to said reproducing device; a code record for applying a decoding signal to said decoding device having characteristics corresponding to said coding schedule; a signal-recording medium coupled to said code record and actuated during times of operation of said decoding device; a signal-selecting circuit coupled to said receiving apparatus for obtaining said charging signal separately from said decoding signal; and means coupled to said selecting circuit and responsive to the derived charging signal for recording a signal on said medium identifying said charging signal during intervals of utilization of said television signal by said receiver.

6. A subscription receiver for utilizing a radiated television signal coded in accordance with a coding schedule during a program interval and for further utilizing a radiated charging signal independent of said coding schedule received concurrently with said television signal, said receiver comprising: an image-reproducing device; apparatus for receiving said coded television signal and for supplying said television signal to said reproducing device; a decoding device coupled to said last-mentioned apparatus responsive to an applied decoding signal for effectively decoding said television signal as applied to said reproducing device throughout said program interval; a code record for applying a decoding signal to said decoding device having characteristics corresponding to said coding schedule; a coin-operated time switch for energizing said code record for selected intervals; a signal-recording medium coupled to said code record and actuated during times of operation of said decoding device; a signal-selecting circuit coupled to said receiving apparatus for obtaining said charging signal separately from said decoding signal; and means coupled to said selecting circuit and responsive to the derived charging signal for recording a signal on said medium identifying said charging signal during intervals of utilization of said television signal by said receiver.

7. A subscription receiver for utilizing a radiated television signal coded in accordance with a coding schedule and for further utilizing a plurality of radiated charging signals independent of said coding schedule received concurrently with said television signal, said receiver comprising: an image-reproducing device; apparatus for receiving said coded television signal and for supplying said television signal to said reproducing device; a decoding device coupled to said last-mentioned apparatus responsive to an applied decoding signal for effectively decoding said television signal as applied to said reproducing device; a code record for applying a decoding signal to said decoding device having characteristics corresponding to said coding schedule; a coin-operated time switch for energizing said code record for selected intervals; a signal-recording medium mechanically coupled to said code record and actuated during intervals of energization of said decoding device; signal-selecting circuits coupled to said receiving apparatus for obtaining said charging signals separately from said decoding signals; and means coupled to said selecting circuits and responsive to the derived charging signals for recording corresponding signals on said medium identifying said charging signals during intervals of utilization of said television signal by said receiver.

References Cited in the file of this patent

UNITED STATES PATENTS

| | | |
|---|---|---|
| 2,540,144 | Stern | Feb. 6, 1951 |
| 2,543,116 | Llewellyn | Feb. 27, 1951 |
| 2,551,068 | Striker | May 1, 1951 |
| 2,563,448 | Aram et al. | Aug. 7, 1951 |
| 2,567,545 | Brown | Sept. 11, 1951 |
| 2,570,188 | Aram et al. | Oct. 9, 1951 |
| 2,573,349 | Miller et al. | Oct. 30, 1951 |
| 2,574,462 | Brown | Nov. 13, 1951 |